United States Patent
Janko et al.

(10) Patent No.: US 7,061,920 B2
(45) Date of Patent: Jun. 13, 2006

(54) STREAMING MEDIA QUALITY ANALYZER SYSTEM

(75) Inventors: Bozidar Janko, Portland, OR (US); Kevin M. Ferguson, Beaverton, OR (US); Gale L. Straney, Aloha, OR (US); George M. Williams, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 768 days.

(21) Appl. No.: 09/836,969

(22) Filed: Apr. 17, 2001

(65) Prior Publication Data

US 2002/0150102 A1    Oct. 17, 2002

(51) Int. Cl.
  *H04L 12/28* (2006.01)
(52) U.S. Cl. .................. 370/395.5; 395/474
(58) Field of Classification Search .............. 370/241, 370/254, 389, 394, 395.5, 464, 465, 466, 370/473, 474; 709/231; 348/192
  See application file for complete search history.

(56) References Cited

U.S. PATENT DOCUMENTS

| | | | | |
|---|---|---|---|---|
| 5,446,492 A | * | 8/1995 | Wolf et al. | 348/192 |
| 5,768,527 A | * | 6/1998 | Zhu et al. | 709/231 |
| 5,883,665 A | * | 3/1999 | Galler et al. | 348/192 |
| 6,411,623 B1 | * | 6/2002 | DeGollado et al. | 370/395.1 |
| 2002/0181408 A1 | * | 12/2002 | Sirivara et al. | 370/252 |

* cited by examiner

*Primary Examiner*—Frank Duong
(74) *Attorney, Agent, or Firm*—Francis I. Gray; Matthew D. Rabdau

(57) ABSTRACT

A streaming media quality analyzer system compares original streaming media from a source, or original packetized streaming media from the source, with a reconstructed packetized streaming media representing the packetized streaming media as received over a network in a connectionless manner at a remote site. At the remote site the received packetized streaming media is analyzed to determine time of arrival of the packets including identification of missing packets. The analysis results are transmitted over the network to a measurement site and used to reconstruct the received packetized streaming media from the original packetized streaming media. The reconstructed packetized streaming media is then analyzed to determine the quality of the packetized streaming media received at the remote site.

15 Claims, 3 Drawing Sheets

STREAMING MEDIA QUALITY ANALYZER SYSTEM

BACKGROUND OF THE INVENTION

The present invention relates to streaming media, and more particularly to a streaming media quality analyzer system for measuring the quality of reception at remote sites.

Media service providers (MSPs) have a goal of providing customers with streaming media, such as video/audio data, over a network, such as the Internet. Because of bandwidth limitations of the network and the wide bandwidth nature of video data, for example, data compression is required, such as MPEG2 and the like, to reduce the bandwidth of the data to fit within the bandwidth constraints of the network. The compressed data is packetized and transported over the network to the customer at a remote site. The streaming nature of video favors using connectionless data packets, such as UDP packets, for sending the video packets over the network. Being connectionless, the UDP packets do not assure that all of the packets are received by the customer. If some of the packets are lost or displaced as a result of network losses, when decoded these packets produce defective data, such as impaired video. This is an irritant to the customer, and therefore the MSP needs to determine when there are network problems that are affecting the quality of the streaming media as viewed by the customer. Alternatively using TCP/IP protocol, occasional loss of a packet maps into a delay in packet delivery, as the missing packet gets re-transmitted.

What is desired is a streaming media quality analyzer system that detects when defective data is being received by the customer so that a media service provider can take steps to remedy the situation and alleviate the irritant to the customer.

BRIEF SUMMARY OF THE INVENTION

Accordingly the present invention provides a streaming media quality analyzer system that compares original streaming media from a source, or original packetized streaming media from the source, with a reconstructed packetized streaming media representing the packetized streaming media as received over a network at a remote site. At the remote site the received packetized streaming media is analyzed to determine time of arrival of the packets which includes identification of missing packets. The analysis results are transmitted over the network to a measurement site and used to reconstruct the received packetized streaming media from the original packetized streaming media. The reconstructed packetized streaming media is then analyzed to determine the quality of the packetized streaming media received at the remote site.

The objects, advantages and other novel features of the present invention are apparent from the following detailed description when read in conjunction with the appended claims and attached drawing.

DETAILED DESCRIPTION OF THE INVENTION

Figure 1:
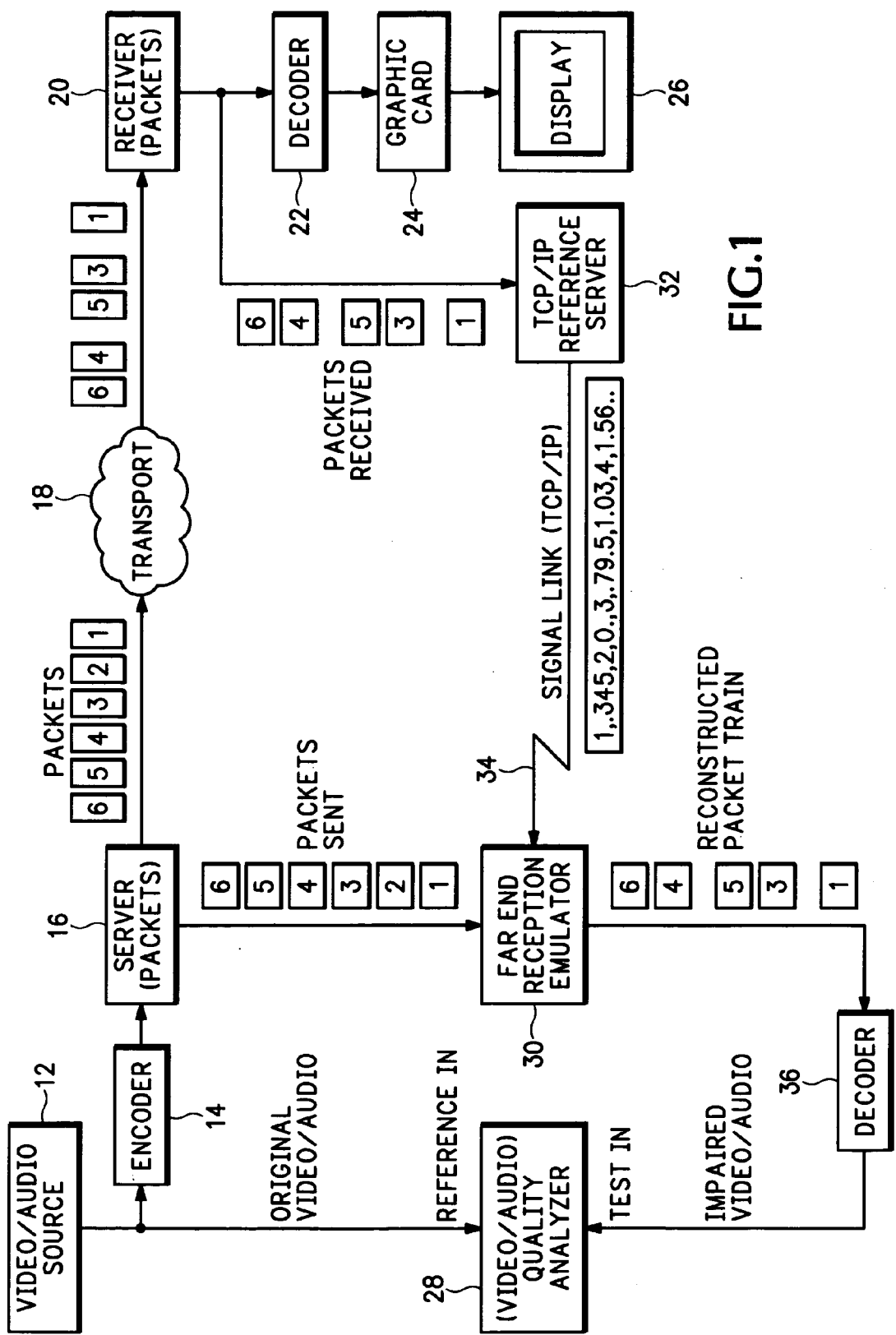
FIG. 1 is a block diagram view of a streaming media quality measurement system according to the present invention.

Referring now to FIG. 1 a streaming media signal, such as video/audio data, from a source 12 is input to an encoder 14 for data compression according to a standard compression scheme, such as MPEG2, MPEG4 or the like for video. The compressed media from the encoder 14 is packetized by a server 16 into data packets, such as UDP (User Datagram Protocol) packets. UDP is a transport layer protocol that allows an application program on one host to sent a connectionless datagram to an application program on another host. This protocol is used for traffic, such as streaming video/audio, generated by applications that can't adapt their timing behavior to network conditions. The packets are transported from the server 16 over a network 18, such as the Internet, to a receiver 20 at a remote site. The receiver 20 receives the transport layer with the data packets as affected by transport over the network and extracts the data packets containing the compressed media. The data packets are decoded by a decoder 22 and the resulting decoded media is processed by a graphics card 24 for viewing on a display 26. This is a standard streaming media system for transmitting time sensitive information from a source over a network to a receiver. If some of the packets are missing or displaced in sequence as the result of network losses, the media viewed on the display 26 or the protocol (MPEG2, etc.) required to decode the image is degraded.

At the headend or originating end the original media signal also may be input to a media (video/audio) quality analyzer 28. The data packets from the server 16 are input to a reception emulator 30. At the remote site the received packets from the receiver 20 are input to a reference server 32 in which details of their arrival or the time they are received by the decoder are taken, such as the time of arrival and sequence number of these IP packets and/or their payloads. This information, which has just a few numbers for each video frame received, is encoded as signal data packets in a connected transport layer, such as a TCP/IP transport layer, and is transmitted via a signal link 34, which also may be the Internet, to the reception emulator 30. The Transmission Control Protocol (TCP), part of the Internet Protocol (IP) suite, is a protocol used to establish a connection between end systems for the reliable delivery of data and sets up a two-way connection between the headend and the reception end. Alternatively the information may be returned to the headend using RTP/RTCP (Realtime Transport Protocol and Realtime Transport Control Protocol) protocols according to the IETF standard. These protocols ride as an application sublayer on top of UDP to provide time stamping, delivery monitoring and sequence numbering, and provide a mechanism for hosts involved in an RTP session to exchange information, such as packet counts, packets lost, interarrival jitter, etc. At the reception emulator 30 the information regarding the timing of arrival or loss of the signal data packets from the remote site is used to reconstruct or reassemble the original data packets from the server 16 according to the information received from the remote site to resemble the packet arrangement at the remote site. Thus a replica of the defective streaming media at the remote site is created. The reconstructed received data packet train is then input to a decoder 36 to recover the impaired media as seen at the remote site or may be input to a protocol analyzer to ensure protocol compliance. The impaired media may also be input to the media quality analyzer 28 for comparison with the original media. The media quality analyzer 28 provides a quantitative measure of the degradation of the received media with respect to the original media using either a "single-ended" measurement algorithm on the reconstructed streaming media or a "double-ended" measurement algorithm, such as a Human Vision Model or a Reduced Reference Model for video. The collection of a very limited amount of defect descriptor data at the remote site does not significantly load the remote site.

Figure 2:
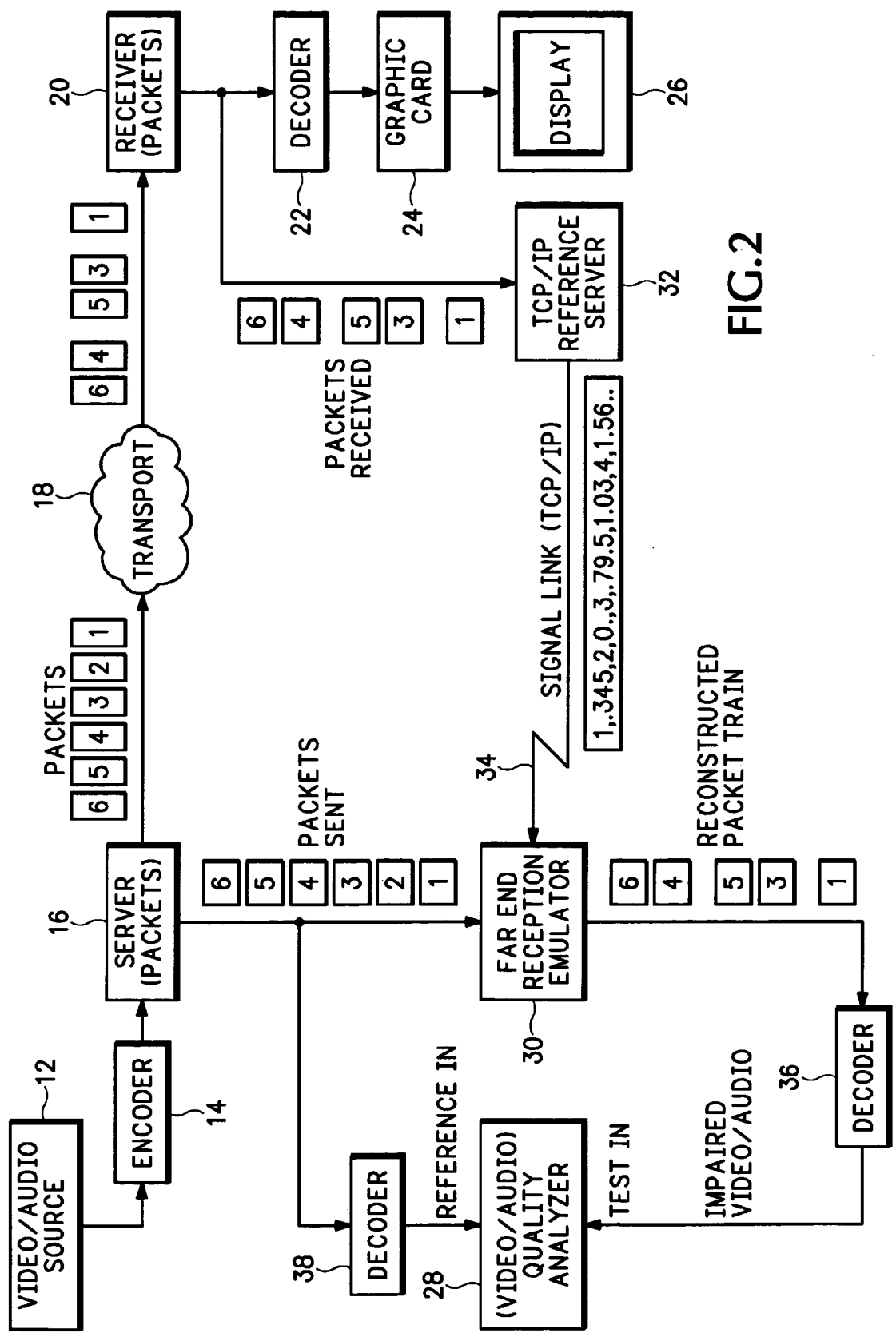
FIG. 2 is a block diagram view of a network-centric streaming media quality measurement system according to the present invention.

An alternative embodiment, as shown in FIG. 2, rather than using the original media from the source 12 as the reference media for the media quality analyzer 28, the media for input to the reference input of the media quality analyzer 28 is derived via another decoder 38 from the original data packets from the server 16.

Figure 3:
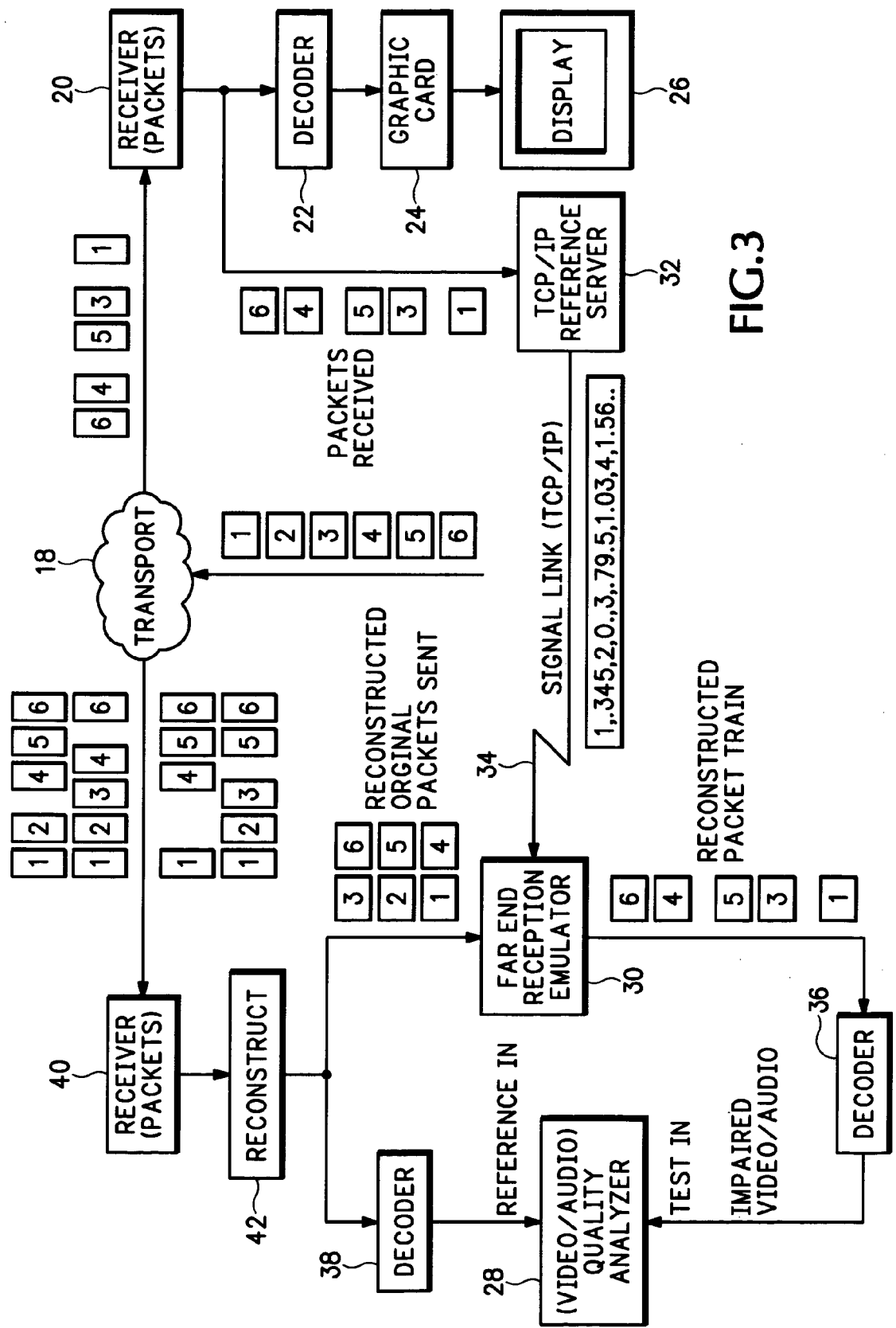
FIG. 3 is a block diagram view of a streaming media quality measurement system when the original source is not available according to the present invention.

In yet another embodiment when access to the source media is denied or not available is shown in FIG. 3, a test receiver 40 at a measurement site receives the data packets from the network 18. An original packet reconstructor 42 receives the data packets from the test receiver 40 to produce a reconstructed packet train corresponding to the original packet train transmitted from the (unavailable) source. The reference stream is built by successively reacquiring streaming media from the source for a typical "video on demand" system. The reconstructed original packet stream is then processed together with the defect descriptor data from the remote site as in FIG. 2 above.

Additional data returned from the remote site may be information on computer graphics cards used there, as these also have an impact on media quality. Also MPEG stream analysis may be performed instead of rendered video quality analysis as described above. Audio streaming quality may also be measured as described above.

Thus the present invention provides a streaming media quality analyzer system by having a remote site analyze received data packets and provide the resulting details via a signal link to a measurement site so that the remote site data packets may be reconstructed from the originally transmitted data packets for quality analysis.

What is claimed is:

1. A streaming media quality analyzer system comprising:
    means for transmitting packetized streaming media from a source over a network to a remote site;
    means for performing an analysis of the packetized streaming media received at the remote site;
    means for transmitting results of the analysis over the network to a measurement site;
    means for reconstructing at the measurement site using the results of the analysis the packetized streaming media received at the remote site; and
    means for analyzing the reconstructed packetized streaming media at the measurement site to determine the quality of the packetized streaming media received at the remote site.

2. The streaming media quality analyzer system as recited in claim 1 wherein the packetized streaming media transmitting means comprises means for packetizing the streaming media into user datagram protocol packets as the packetized streaming media.

3. The streaming media quality analyzer system as recited in claim 2 wherein the results transmitting means comprises means for packetizing the results into transmission control protocol packets.

4. The streaming media quality analyzer system as recited in claim 3 wherein the analyzing means comprises:
    first means for decoding the reconstructed packetized streaming media to recover an impaired streaming media; and
    means for determining from the impaired streaming media the quality of the packetized streaming media received at the remote site.

5. The streaming media quality analyzer system as recited in claim 4 wherein the determining means comprises a media quality analyzer having a reference input coupled to receive the streaming media from the source and a test input coupled to receive the impaired streaming media and providing as an output a measure of the quality of the packetized streaming media received at the remote site.

6. The streaming media quality analyzer system as recited in claim 4 wherein the determining means comprises:
    second means for decoding the packetized streaming media from the source to recover the streaming media; and
    a media quality analyzer having a reference input coupled to receive the streaming media from the second decoding means and a test input coupled to receive the impaired streaming media and providing as an output a measure of the quality of the packetized streaming media received at the remote site.

7. The streaming media quality analyzer system as recited in claim 3 wherein the analyzing means comprises:
    means for recovering the packetized streaming media from the network as originally transmitted by the source, the recovered packetized streaming media being input as the packetized streaming media to the reconstructing means;
    means for decoding the recovered packetized streaming media and the reconstructed packetized streaming media to produce a reference streaming media and an impaired streaming media respectively; and
    means for determining from the reference streaming media and the impaired streaming media a measure of the quality of the packetized streaming media received at the remote site.

8. The streaming media quality analyzer system as recited in claim 2 wherein the results transmitting means comprises means for packetizing the results into realtime transport control protocol packets where realtime transport protocol is used as an application layer over user datagram protocol packets.

9. A method of quality analyzing at a measurement site a streaming media that is packetized and transmitted over a network from a source to a remote site comprising the steps of:
    performing an analysis of the packetized streaming media received at the remote site;
    transmitting results of the analysis over the network to the measurement site;
    reconstructing at the measurement site from the packetized streaming media that was transmitted and the results of the analysis the packetized streaming media received at the remote site; and
    analyzing at the measurement site the reconstructed packetized streaming media to determine the quality of the packetized streaming media received at the remote site.

10. A streaming media quality analyzer system for a streaming media transmission system of the type that transmits streaming media from a source over a network packetized streaming media to a remote site for display comprising:
    means at the remote site for performing an analysis of the packetized streaming media;

means for transmitting results of the analysis over the network to a measurement site;

means at the measurement site for reconstructing from the packetized streaming media from the source and the results from the remote site the packetized streaming media as received at the remote site; and means for analyzing the reconstructed packetized streaming media at the measurement site to determine the quality of the packetized streaming media received at the remote site.

11. A streaming media quality analyzer system for a streaming media system having streaming media transmitted from a source as packetized streaming media over a network to a remote site for use comprising:

a reference server located at the remote site having as an input the packetized streaming media as received at the remote site and having as an output an analysis of the packetized streaming media;

means for transmitting the analysis over the network to a measurement site;

a receiver emulator having as inputs the packetized streaming media and the analysis and having as an output a reconstructed packetized streaming media that resembles the packetized streaming media received at the remote site; and means for analyzing the reconstructed packetized streaming media to determine the quality of the packetized streaming media received at the remote site.

12. The streaming media quality analyzer system as recited in claim 11 wherein the analyzing means comprises:

means for decoding the reconstructed packetized streaming media to produce an impaired streaming media; and a media quality analyzer having the impaired streaming media as an input which determines the quality of the packetized streaming media received at the remote site.

13. The streaming media quality analyzer as recited in claim 12 wherein the media quality analyzer has a reference input to which the streaming media from the source is applied and a test input to which the impaired streaming media is applied, and has an output providing a measure of the quality of the packetized streaming media received at the remote site.

14. The streaming media quality analyzer as recited in claim 13 wherein the analyzing means further comprises a second means for decoding original data packets representing the streaming media in the packetized streaming media to recover the streaming media from the source for input to the media quality analyzer.

15. The streaming media quality analyzer as recited in claim 14 wherein the analyzing means further comprises means at the measurement site for recovering the packetized streaming media from the network resembling the packetized streaming media prior to transmission over the network, the recovered packetized streaming media being input to the second decoding means to recover the streaming media from the source.

* * * * *